No. 787,298. PATENTED APR. 11, 1905.
J. E. KELLER, Jr.
INFLATION VALVE.
APPLICATION FILED MAY 7, 1904.
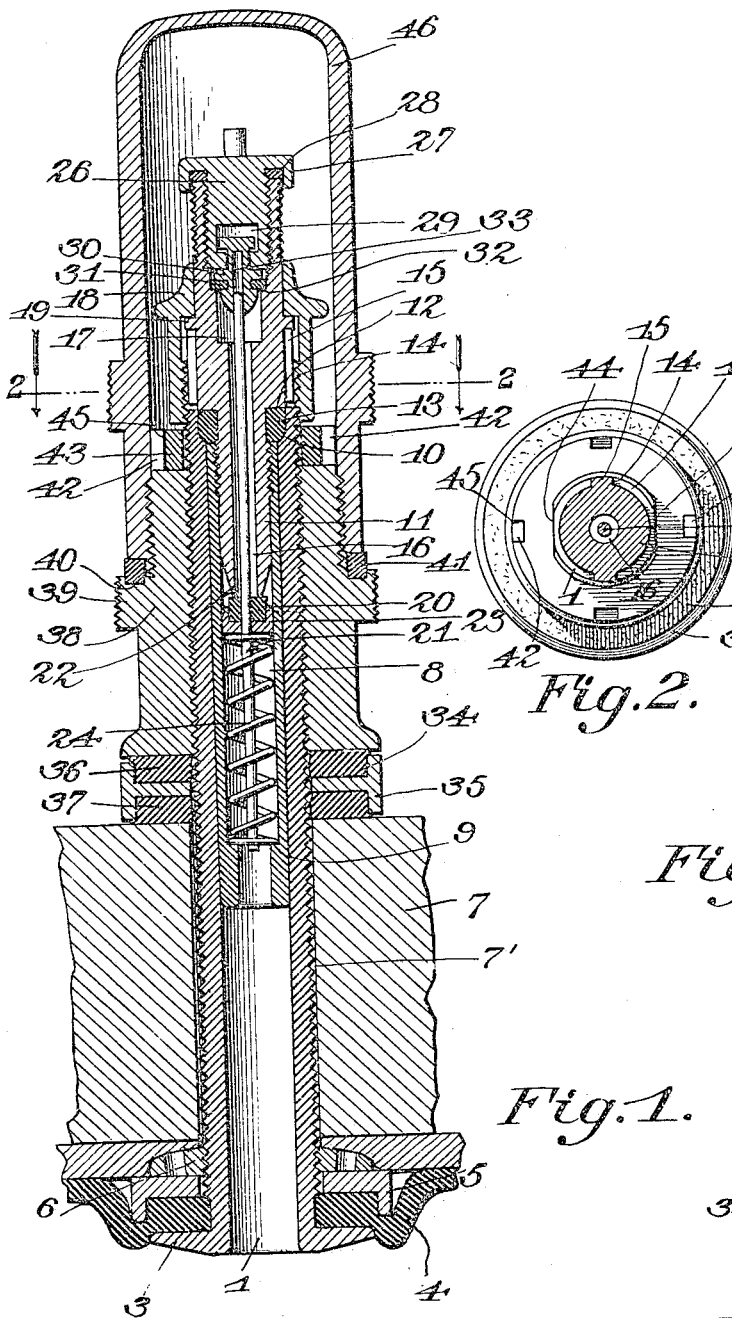
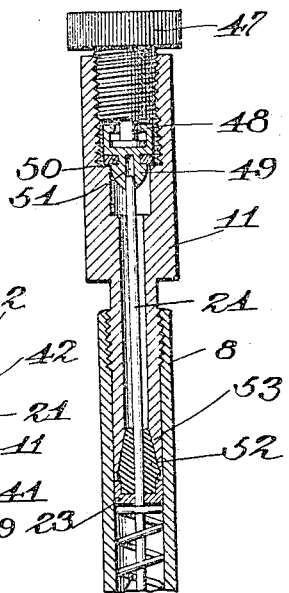
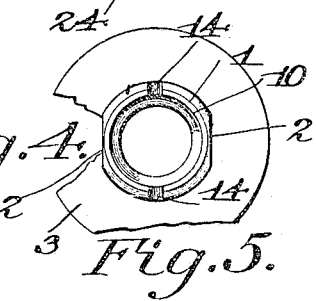
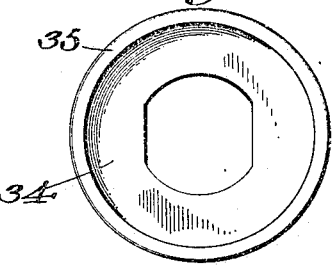
John E. Keller, Jr.
Inventor
Witnesses No. 787,298. Patented April 11, 1905.

UNITED STATES PATENT OFFICE.

JOHN ESTEN KELLER, JR., OF LITCHFIELD, CONNECTICUT.

INFLATION-VALVE.

SPECIFICATION forming part of Letters Patent No. 787,298, dated April 11, 1905.

Application filed May 7, 1904. Serial No. 206,930.

*To all whom it may concern:*

Be it known that I, JOHN ESTEN KELLER, Jr., a citizen of the United States, residing at Litchfield, in the county of Litchfield and State of Connecticut, have invented a new and useful Inflation-Valve, of which the following is a specification.

This invention relates to inflation-valves; and it is designed to provide an improved device of this character for use in connection with pneumatic tires, and in particular for double-tube tires of motor-vehicles.

It is furthermore designed to provide an improved detachable connection between the tubular valve-casing and the rim of the wheel, so as to insure a rigid connection therewith and to exclude water, dirt, &c, from working through the opening in the rim through which the valve-casing projects.

Another object of the invention is to provide an improved dust-cap arrangement for the valve-casing, which may be readily removed to give access to the nipple for connection with an air-pump for the inflation of a tire.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is an enlarged longitudinal sectional view taken through an inflation-valve embodying the features of the present invention. Fig. 2 is a cross-sectional view on the line 2 2 of Fig. 1. Fig. 3 is an enlarged detail longitudinal sectional view of a modified dust-cap arrangement. Fig. 4 is a detail top plan view of the tubular stem. Fig. 5 is a detail view of the washer which embraces the stem.

Like characters of reference designate corresponding parts in each and every figure of the drawings.

As exhibited by the accompanying drawings, 1 designates an open-ended tubular stem which is externally screw-threaded throughout its length and provided with diametrically opposite flat longitudinal portions 2, extending for the entire length of the stem. The inner end of the stem is provided with an external annular flange or head 3, which lies within the tire 4, there being an inverted-cup-shaped washer 5, embracing the stem at the outer side of the tire with a nut 6, bearing against the washer to snugly grip the tire between the flange 3 and the washer. The rim 7 of the wheel is provided with a substantial radial opening 7', through which the stem 1 is projected and extends a suitable distance upon the outer side of the rim for the support of the several parts of the inflation-valve and the means for rigidly connecting the stem with the rim. Within the stem there is an open-ended tubular valve-casing 8, which is reduced near its lower end to form an inner annular shoulder 9, while its outer end is internally screw-threaded and terminated short of the outer end of the stem, said outer end of the stem being counterbored, as at 10, beyond the outer end of the casing.

Fitted within the outer end of the valve-casing 8 is a valve-plug 11, which is intermediately screw-threaded to engage the screw-threads of the valve-casing and has its outer end portion enlarged to form an annular shoulder 12, against the under side of which is a packing-ring 13, which fits in the counterbore 10 of the stem 1 and also bears upon the outer end of the valve-casing 8, thereby to form an air-tight joint between these members when the plug is screwed into the valve-casing. To prevent rotation of the plug and valve-casing within the stem, the upper end of the latter is provided with a pair of diametrically opposite slots or notches 14, constituting seats for the reception of external radial projections 15 upon the enlarged portion of the plug, so that after the casing 8 and plug 11 have been assembled and inserted into the tubular stem the projections 15 are adapted to be received in the seats 14, and thereby obviate rotation of the plug and valve-casing.

The plug 11 is of course tubular and has a lower contracted bore portion 16 and an upper enlarged bore portion 17, with the upper extremity of the plug screw-threaded internally and externally to constitute a nipple for connection with the nipple of an air-pump. A tubular plug-retaining cap 18 rotatably embraces the outer portion of the plug and has an inner annular shoulder to bear against an annular flange 19 upon the plug, the lower portion of the cap being internally screw-threaded to engage the externally screw-threaded outer end portion of the tubular stem 1, thereby to maintain the plug rigidly within the stem. By means of this retaining-cap the plug may be set tightly against the packing 13, so as to insure an air-tight joint between the plug and the tubular stem.

Within the lower portion of the tubular valve-casing 8 is a valve 20, which is centrally pierced by a valve-stem 21, which extends from the lower portion of the tubular casing upwardly through the tubular plug and nearly to the top thereof in order that its upper end may be accessible to permit of the same being pushed inwardly to unseat the valve from the valve-seat 22, formed by the lower end of the plug 11. The valve 20 is preferably of rubber and is supported within a cup 23, carried concentrically by the valve-stem. While the pressure of the air is ordinarily sufficient to maintain the valve seated, if desired, a helical spring 24 may be employed within the lower end of the tubular valve-casing 8, with its lower end bearing against the shoulder 9 and its upper end bearing against the cup 23, carried by the stem, thereby to insure an effective seating of the valve.

While the ordinary form of dust-cap now in common use may be employed at the outer end of the plug 11, I have provided an improved closure therefor consisting of a plug 26, which is externally screw-threaded to fit within the internally-screw-threaded outer end or nipple portion of the plug, there being a flanged head or cap 27 at the outer end of the plug to embrace the nipple, with a packing-ring 28 within the cup and designed to bear upon the outer end of the nipple. An internally-flanged socket 29 is formed in the inner end of the dust-cap plug, and within this socket is rotatably received the headed end of a washer-carrying member or pin 30, which is provided with an intermediate annular groove for the reception of a packing-ring or washer 31, which is designed to be seated upon an inner annular shoulder 32 within the plug 11. By this assemblage of the plug 26 and the member 30 the latter is non-rotatable during the rotation of the plug in screwing the latter into the nipple, wherefore there is no grinding upon the washer, and the latter is merely pressed into snug engagement with the annular shoulder 32. Hence there is little or no wear upon the washer, and therefore the life thereof is materially increased. A longitudinal socket or bore 33 is formed in the lower end of the member 30 to form a guide for the slidable reception of the upper end of the valve-stem 21.

After the parts thus described have been assembled, but prior to the application of the retaining-cap 18, a composite washer is slipped over the stem 1 and consists of a disk or plate 34, having a central opening which is provided with diametrically opposite flattened edge portions to engage the flat faces of the stem and prevent rotation of the washer. At the outer edge of the plate there is an annular flange 35, which projects above and below the plate, and within the upper and lower portions of this flange are yieldable packing-rings or washer members 36 and 37. A retaining-nut 38 is fitted to the stem 1 and bears upon the washer member 36, said nut being provided with an intermediate external annular shoulder 39, which is milled or knurled to form a roughened surface, affording a finger-grasp for applying and removing the nut. An annular groove 40 is formed in the top of the shoulder 39, and a yieldable packing-ring or washer 41 is seated in this groove and projects above the top of the shoulder. From the top of the nut 38 rise diametrically opposite projections 42, which are spaced from the stem 1. Upon the top of the nut is a locking ring or washer 43, having its inner peripheral edge provided with diametrically opposite flat portions 44 to engage the flat portions of the stem 1 and prevent rotation of the washer, the outer edge of said washer being provided with a series of peripheral notches 45, constituting seats for the reception of the projections 42, thereby to interlock the nut with the washer and prevent accidental rotation and consequent loosening of the nut. After the locking-washer has been fitted in place, the retaining-cap 18 is screwed down upon the outer end of the stem 1, but not in engagement with the locking-washer, thereby to prevent outward displacement of the latter when the inflation-valve is at the top of a wheel. When all of the parts of the present device have been assembled in the manner described, an outer supplemental dust-cap 46 in the form of a tube closed at its top and open at its bottom is fitted over the outer end of the device and screwed upon the outer externally-threaded portion of the nut 38 and into snug engagement with the washer 41.

In Fig. 3 of the drawings there has been shown a modified arrangement of the dust-cap for the plug 11, wherein the plug member 47 of the cap is provided at its lower end with a headed stem 48, rotatably fitted within a flanged socket in the upper end of a washer-carrying member 49, the latter being provided with an external annular groove, within which a washer 50 is seated. In the lower end of the member 49 is a socket 51 for the reception of the upper end of the valve-stem 21. It will here be noted that the main difference between the two forms of dust-caps resides in a reversal of the disposition of the socket and the stem member to be swiveled therein. Fig. 3 also exhibits a slightly different arrangement of valve 52, which is substantially conical in shape and fits within the internally-tapered lower end 53 of the plug 11 instead of engaging the lower extremity only of the plug, as in Fig. 1 of the drawings.

Having thus described the invention, what I claim is—

1. An inflation-valve comprising an externally-screw-threaded tubular stem for insertion through a rim, valve mechanism carried within the stem, a nut embracing the stem, and a washer to be interposed between the nut and the rim and comprising a metallic ring provided with a central opening of a diameter to slidably embrace the stem and also provided with an outer cylindrical flange, and a yieldable washer-ring fitted within the flange of the metal ring and projected at the outer edge of the flange.

2. An inflation-valve comprising an externally-screw-threaded tubular stem for insertion through a rim, valve mechanism carried within the stem, a nut embracing the stem, and a washer to be interposed between the nut and the rim comprising a metallic ring member provided with a central opening of a diameter to slidably embrace the stem and also provided with an outer cylindrical flange projected away from the nut, and a yieldable washer-ring fitted within the flange of the metal ring and projected at the outer edge of the flange for engagement with a rim.

3. An inflation-valve comprising a tubular stem for insertion through a rim and externally screw-threaded, valve mechanism carried within the stem, a nut embracing the stem, and a washer to be interposed between the nut and a rim and comprising a metallic ring member having a cylindrical flange projecting at opposite sides thereof, and yieldable washer-rings fitted within the flanges of the metal ring and projected at the outer edges of said flanges.

4. An inflation-valve comprising a tubular stem to be inserted through a rim and having external screw-threads and a flattened portion intersecting the screw-threads, valve mechanism carried within the stem, a washer embracing the stem and made up of a metallic ring having an outer peripheral flange projected at opposite sides of the ring, the inner periphery of said ring having a flattened portion to engage the flattened portion of the stem, yieldable ring members fitted within the flanges and projected at the outer edges thereof, a nut fitted upon the stem to engage one of the yieldable members of the washer and provided at its outer end with a longitudinal projection, and a locking-washer fitted upon the stem with its inner periphery provided with a flat portion to engage the flat portion of the stem, said washer having one or more notches for the reception of the projection.

5. In an inflation-valve, the combination of a tubular externally-screw-threaded stem to be inserted through a rim and provided with a longitudinal flattened portion, valve mechanism carried within the stem, a valve-plug fitted in the outer end of the stem and projected beyond the same, a nut embracing the stem for engagement with a rim, a locking-washer embracing the stem and having its inner periphery provided with a flattened portion for engagement with the flattened portion of the stem, there being a pin-and-socket engagement between the nut and the washer, and a plug-retaining cap embracing the plug and the stem at the outer side of the locking-washer, said retaining-cap constituting a stop to prevent separation of the locking-washer from the nut.

6. In an inflation-valve, the combination of a tubular stem to be inserted through a rim and externally screw-threaded, valve mechanism carried within the stem, a rim-engaging nut fitted upon the stem, and a dust-cap embracing the stem and detachably carried by the nut.

7. In an inflation-valve, the combination with a valve-casing having an internally-screw-threaded nipple for engagement with the nipple of an air-pump, of a closure therefor comprising a screw-threaded plug to fit the nipple, and a carrier member swiveled upon the inner end of the plug and provided with a packing-ring or washer for engagement with the casing.

8. In an inflation-valve, the combination of a casing having an internally-screw-threaded nipple for connection with an air-pump and also provided with a valve mechanism including a stem, a screw-threaded closure-plug removably fitted within the nipple, and a washer-carrying member swiveled upon the inner end of the plug and provided with an opening constituting a guide for the valve-stem.

9. In an inflation-valve, the combination of a casing having an inner annular shoulder and a screw-threaded nipple for connection with an air-pump, a valve mechanism within the casing and including a stem, a screw-threaded closure for the nipple, a carrier member swiveled upon the inner end of the closure and provided with an opening constituting a guide for the valve-stem, and a washer carried by the carrier member for engagement with the inner shoulder of the casing.

10. In an inflation-valve, the combination of an externally-threaded and tubular stem to be inserted through a rim, valve mechanism carried within the stem, a rim-engaging nut embracing the stem and provided with an intermediate external annular shoulder having an annular seat in its outer face, the nut being externally screw-threaded at the seat side of the shoulder, a packing-ring fitted in the seat, and an internally-threaded dust-cap fitting the externally-threaded portion of the nut and engaging the packing-ring.

11. In an inflation-valve, the combination of a tubular stem to be inserted through a rim, valve mechanism carried within the stem, a rim-engaging member embracing the stem and provided with an external annular shoulder having an annular seat in its outer face, said member being externally screw-threaded at the seat side of the shoulder, a packing-ring fitted in the seat, and an internally-threaded dust-cap fitting the externally-threaded portion of the rim-engaging member and engaging the packing-ring.

12. In an inflation-valve, the combination of a tubular stem to be inserted through a rim, valve mechanism carried within the stem, a rim-engaging member fitted upon the stem, and a dust-cap embracing the stem and detachably carried by the rim-engaging member.

In testimony that I claim the foregoing as my own I have hereto affixed my signature in the presence of two witnesses.

JOHN ESTEN KELLER, Jr.

Witnesses:
M. W. BUEL,
KATHERINE L. BUEL.